United States Patent [19]

Speranza et al.

[11] Patent Number: 5,109,061

[45] Date of Patent: Apr. 28, 1992

[54] SURFACTANTS CONTAINING A POLYURETHANE OR POLYUREA POLYMER

[75] Inventors: George P. Speranza, Austin; Jiang-Jen Lin, Houston, both of Tex.

[73] Assignee: Texaco Chemical Company, White Plains, N.Y.

[21] Appl. No.: 487,093

[22] Filed: Mar. 2, 1990

[51] Int. Cl.⁵ .................... C08J 3/20; C08L 75/02; C08L 75/04; C08K 5/00

[52] U.S. Cl. .................... 524/710; 524/723; 524/724; 524/745; 524/755; 524/762; 524/779

[58] Field of Search ............ 524/755, 762, 710, 723, 524/724, 745, 779

[56] References Cited

U.S. PATENT DOCUMENTS

| | | | |
|---|---|---|---|
| 3,383,320 | 5/1968 | Bell, Jr. | 252/132 |
| 3,781,238 | 12/1973 | Helm | 524/762 |
| 3,949,137 | 4/1976 | Akrongold et al. | 428/311 |
| 4,020,015 | 4/1977 | Bevan | 252/544 |
| 4,093,569 | 6/1978 | Reischl et al. | 524/762 |
| 4,180,491 | 12/1979 | Kim et al. | 524/317 |
| 4,190,550 | 2/1980 | Campbell | 252/93 |
| 4,193,887 | 3/1980 | Stone et al. | 252/91 |
| 4,207,198 | 6/1980 | Kenkare | 252/117 |
| 4,305,857 | 12/1981 | Reischl | 524/762 |
| 4,305,858 | 12/1981 | Reischl | 524/724 |
| 4,323,656 | 4/1982 | Strickman et al. | 521/109 |
| 4,554,097 | 11/1985 | Schebece et al. | 252/542 |
| 4,735,746 | 4/1988 | Speranza et al. | 252/544 |
| 4,746,690 | 5/1988 | Busch et al. | 524/27 |
| 4,806,571 | 2/1989 | Knobel et al. | 524/710 |

*Primary Examiner*—John Kight, III
*Assistant Examiner*—Rabon Sergent
*Attorney, Agent, or Firm*—Jack H. Park; Kenneth R. Priem; David L. Mossman

[57] ABSTRACT

Surfactant compositions comprising a water-soluble polyurethane or polyurea dispersed in a surfactant are described. These compositions are prepared by reacting an aromatic or aliphatic polyisocyanate with a polyol or polyamine in the presence of a surfactant. Solid products of this invention are suitable for preparing molded or shaped articles such as bathtub toys.

55 Claims, No Drawings

SURFACTANTS CONTAINING A POLYURETHANE OR POLYUREA POLYMER

BACKGROUND OF THE INVENTION

1. Field of the Invention

This invention relates to surfactant compositions and to a method for their preparation. More particularly, this invention relates to surfactant compositions of water-soluble polyurethane or polyurea polymers distributed through a surfactant. Polymerization of water-soluble polyurethane or polyurea polymers in the presence of a surfactant produces a persistent water-soluble surfactant composition which can be a liquid or solid. The solid products can be shaped or molded as detergent bars, toys or other useful articles.

2. Prior Art

Surfactant compositions, either in liquid or solid form, have long been used for washing the human body, laundering clothing or cleaning kitchenware. Solid surfactant compositions in the form of solid bars represent a convenient means of dispensing a surface active agent at the point of use. Solid bars having additional components therein, such as abrasives to enhance the cleaning qualities of the bar, are described in the art.

U.S. Pat. No. 4,190,550 describes a soap-filled pad. Needled and crimped synthetic organic fibers are imbedded in a solid soap core. The synthetic fibers may comprise nylon fibers 150 to 200 microns in diameter and 3 cm. in length and may be oriented to provide resilience and strength. Thinner, supple acetate rayon fibers of 20 to 50 micron diameters are more suited to bathing.

U.S. Pat. No. 3,949,137 describes a unitary body sponge having a selected porosity, impregnated with a gel material comprising synthetic detergents or soap. The sponge contains 70 to 200 pores per square inch.

U.S. Pat. No. 4,193,887 describes filled, detergent, hydrophilic flexible polyurethane sponges containing alkyl aryl sulfonate detergents. The polyol and detergent are mixed and then allowed to react with a polyisocyanate in the presence of water. The polyols are water insoluble and so is the polyurethane. The products are water insoluble flexible urethane foams having a reduced and controlled rate of release of the detergent from the foam. The filler employed is preferably a clay material.

U.S. Pat. Nos. 4,207,198 and 4,554,097 describe an improved elastic bar and elastic detergent product which comprises an organic detergent with gelatin and a lower di-or polyhydric alcohol.

U.S. Pat. No. 4,323,656 describes sponges made by entrapping soaps in the sponge using diisocyanates and polyethers or polyester. The sponges are not water-soluble, nor are they polyamides or polyesters.

U.S. Pat. No. 4,020,015 relates to a process in which certain soil-release agents such as a copolymer of polyoxyalkylene glycol and polyethylene terephthalate are given enhanced activity in detergent compositions by incorporating them in granules of a water-soluble detergent compatible carrier.

U.S. Pat. No. 3,383,320 describes a detergent bar consisting of a solid water-soluble detergent such as a soap held in a solid matrix of a sintered thermoplastic resin such as polypropylene or polyethylene powder.

U.S. Pat. No. 4,735,746 describes a detergent bar consisting of 5 to 95 weight percent of a water-soluble polyamide or polyester with a surface active agent as the major portion of the balance.

SUMMARY OF THE INVENTION

This invention is a surfactant composition, including long-lasting surfactant bars, comprising a water-soluble polyurethane or polyurea or mixtures dispersed in a surfactant. Generally, the surfactant composition will comprise about 2 to about 98 weight percent and preferably about 5 to about 95 weight percent of the water-soluble polymer with the surfactant as a major portion of the balance of the composition. The surfactant compositions can also include small amounts of insoluble polyurethanes or polyureas to improve the properties of the finished product.

The process for preparing the surfactant compositions of this invention comprises reacting under mild conditions a polyisocyanate, a polyglycol, or a polyamine and a surfactant to form the corresponding water-soluble polyurethane or polyurea polymer dispersed through the surfactant.

DESCRIPTION OF THE PREFERRED EMBODIMENTS

The process of this invention which requires only mild temperatures is an improvement over the art relating to the preparation of surfactant compositions including solid detergent bars which generally require higher processing temperatures. Thus, heat sensitive soaps such as quaternary ammonium halides and tertiary amine oxides can be employed. The surfactant compositions can be prepared with ease using the process of this invention which affords considerable flexibility in the selection of suitable starting materials and processing parameters. Thus, hard soaps as well as soft waxy products can be made.

Generally, the process is conducted at temperatures ranging from about ambient to about 150° C. and at pressures ranging from 1 to about 10 atmospheres. The process of this invention can be conducted, if desired, in the presence of a chain extender such as ethylene glycol. The amount of the chain extender is somewhat limited if water-soluble products are desired. Detergent builders such as sodium tripolyphosphate, zeolites, sodium metasilicate, sodium carbonate nitrilotriacetic acid sodium salt, etc. may also be incorporated in the surfactant compositions of this invention. If a high ratio of the polyisocyanate, on a molar basis, compared to the hydroxy values of the diols and chain extenders, if used, some of the anionic detergents, i.e., detergents with hydroxyl groups, will be tied up as part of the polymer chain. Therefore, by changing the ratio of the isocyanate to hydroxy or amino groups the foaming and wetting characteristics of the final product can be varied.

In this invention a wide variety of polyols are useful for reacting with the polyisocyanate in forming the polyurethane polymers. Preferred polyols are polyoxyalkylene glycols such as the alkylene oxide adducts of a polyhydric alcohol with a functionality of from about 2 to about 4. The alkylene oxide may suitably be ethylene oxide, 1,2-propylene oxide, or 1,2-butylene oxide or a mixture of some or all of these provided the polyoxyalkylene glycol is at least 50 percent by weight ethylene oxide. The polyol will preferably have a molecular weight within the range of from about 600 to about 9,000 or more. Polyoxyalkylene glycols in which the diol is 100 percent derived from ethylene oxide and having molecular weights greater than 600 and, preferably, from 600 to about 6500, are especially preferred. Such products are also known as polyethylene glycols. Products of this type are exemplified by, but not limited to, E 900 and E 4500 from the Dow Chemical Co. which have molecular weights of 900 and 4500, respectively.

The polyisocyanate used to react with the polyoxyalkylene glycol in the process of this invention may be an aromatic or aliphatic polyisocyanate.

Typical aromatic polyisocyanates include a p-phenylene diisocyanate, polymethylene polyphenylisocyanate, 2,6-toluene diisocyanate, dianisidine diisocyanate, bitolylene diisocyanate, napthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These isocyanate compounds are produced by the phosgenation of corresponding methylene bridged polyphenyl polyamines, which are conventionally produced by the reaction of formaldehyde and primary aromatic amines, such as aniline in the presence of hydrochloric acid and/or other acidic catalysts. Known processes for preparing polyamines and corresponding methylene-bridged polyphenyl polyisocyanates therefrom are described in U.S. Pat. Nos. 2,683,730; 2,950,263; 3,012,008; 3,344,162 and 3,362,979.

Usually methylene-bridged polyphenyl polyisocyanate mixtures contain about 20 to about 100 wt % methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 wt % methylene diphenyldiisocyanate isomers, of which 20 to about 95 wt % thereof is the 4,4'-isomer with the remainder being polymethylene polyphenyl polyisocyanates of higher molecular weight and functionality that have an average functionality of from about 2.1 to about 3.5. These isocyanate mixtures are commercially available and can be prepared by the process described in U.S. Pat. No. 3,362,979 to Floyd E. Bentley.

Preferably, the amount of the polyisocyanate used is the stoichiometric amount of greater than the stoichiometric amount, based on the polyol or polyamine employed in preparing the water-soluble polymers.

Polyamines, i.e., polyfunctional amines, useful in preparing the surfactant compositions of this invention include a wide variety of diamines which, preferably, have molecular weights ranging from about 200 to about 4000 or more.

Useful higher molecular weight alkylene glycol diamines are, for example, those having the formula: $H_2NRNH_2$, wherein the radical R is a polyoxyalkylene chain of molecular weight of from about 200 to about 4000 having terminal carbon atoms to which nitrogen atoms are bonded. The radical R has the formula:

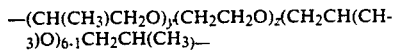

wherein y ranges from 1 to 5, preferably 1 to 3, and z ranges from 1 to 90.

Typical polyoxyalkylenediamines of the above type which are commercially available and useful for producing water-soluble polyureas include:

a. The diterminal diamine of mixed polyoxypropylene and polyoxyethylene of molecular weight 600. As marketed under the trademark JEFFAMINE®ED-600, the average value in the formula of y is 1.50 and z is 8.70.

b. The diterminal diamine of mixed polyoxypropylene and polyoxyethylene of molecular weight 900. As marketed under the trademark JEFFAMINE ®ED-2900, the average value in the formula of y is 1.50 and of z is 15.6.

c. The diterminal diamine of mixed polyoxypropylene and polyoxyethylene of molecular weight 2000. As marketed under the trademark the JEFFAMINE® ED-2001, the average value in the formula of y is 1.50 and of z is 41.8.

Other higher molecular weight alkylene glycol diamines which are made by adding acrylonitrile to glycols and then hydrogenating the adduct are suitable for preparing water-soluble polyureas. These diamines have the formula:

$$NH_2-CH_2CH_2CH_2O-(CH_2CH_2O)_xCH_2CH_2CH_2-NH_2$$

wherein x ranges from 1 to 100.

Other useful JEFFAMINE®amines include:
JEFFAMINE®ED-4000 amine having a molecular weight of about 4000 described by the formula:

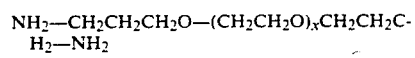

JEFFAMINE®EDR-148, triethyleneglycol diamine, and
JEFFAMINE®EDR-192, tetraethyleneglycol diamine, etc.

Polyoxyalkylenediamines such as JEFFAMINE® D series, as exemplified by but not limited to:

JEFFAMINE ® D-230 having the formula:
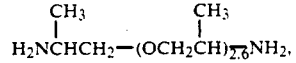

JEFFAMINE ® D-400 having the formula:
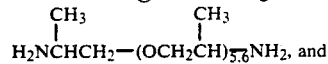
, and

JEFFAMINE ® D-2000 having the formula:
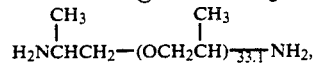

which, in general, yield water-insoluble polyureas when allowed to react with polyisocyanates may be employed in conjunction with amines of the JEFFAMINE®ED-series in amounts up to about 50 weight percent based on the amount of the ED-series amine used.

All of the above JEFFAMINE ® polyoxyalkyleneamine products are marketed by the Texaco Chemical Company, Houston, Texas.

An essential ingredient of the surfactant composition of the present invention is a suitable surfactant. The surfactants are broadly defined as surfactants selected from the group consisting of anionic, nonionic, ampholytic, zwitterionic, and cationic surfactants and soap.

Anionic surfactants operable in compositions suitable for use in the present invention can be broadly described as the water-soluble salts, particularly the alkali metal salts, of organic sulfuric acid reaction products having in their molecular structure an alkyl or alkaryl radical containing from about 8 to about 22 carbon atoms and a radical selected from the group consisting of sulfonic acid and sulfuric acid ester radicals. The term alkyl is intended to include the alkyl portion of higher acyl radicals. Important examples of the anionic surfactants which can be employed in the practice of the present invention are the sodium or potassium alkyl sulfates, especially those obtained by sulfating the higher alcohols ($C_8$-$C_{18}$ carbon atoms) produced by reducing the glycerides of tallow or coconut oil; sodium or potassium alkyl benzene sulfonates, in which the alkyl group contains from about 9 to about 15 carbon atoms (the alkylradical can be a straight or branched aliphatic chain); paraffin sulfonate surfactants having the general formula $RSO_3M$, wherein R is a primary or secondary alkyl group containing from about 8 to about 22 carbon atoms (preferably 10 to 18 carbon atoms) and M is an alkali metal, e.g., sodium or potassium; sodium alkyl glyceryl ether sulfonates, especially those ethers of the higher alcohols derived from tallow and coconut oil; sodium coconut oil fatty acid monoglyceride sulfates and sulfonates; sodium or potassium salts of sulfuric acid esters of the reaction product of one mole of a higher fatty alcohol (e.g., tallow or coconut oil alcohols) and about 1 to 10 moles of ethylene oxide; sodium or potassium salts of alkyl phenol ethylene oxide ether sulfates with about 1 to about 10 units of ethylene oxide per molecule and in which the alkyl radicals contain from about 8 to about 12 carbon atoms; the reaction products of fatty acids esterified with isethionic acid and neutralized with sodium hydroxide where, for example, the fatty acids are derived from coconut oil; sodium or potassium salts of fatty acid amides of a methyl in which the fatty acids, for example, are derived from coconut oil and sodium or potassium -acetoxy- or -acetamidoalkanesulfonates where the alkane has from 8 to 22 carbon atoms.

Nonionic surfactants which can be used in practicing the present invention can be of three basic types: the alkylene oxide condensates, the amides and the semipolar nonionics.

The alkylene oxide condensates are broadly defined as compounds produced by the condensation of alkylene oxide groups (hydrophilic in nature) with an organic hydrophobic compound, which can be aliphatic or alkyl aromatic in nature. The length of the hydrophilic or polyoxyalkylene radical which is condensed with any particular hydrophobic groups can be readily adjusted to yield a water-soluble-compound having the desired degree of balance between hydrophilic and hydrophobic elements.

Examples of such alkylene oxide condensates include:

1. The condensation products of aliphatic alcohols with ethylene oxide. The alkyl chain of the aliphatic alcohol can either be straight or branched and generally contains from about 8 to about 22 carbon atoms. Examples of such ethoxylated alcohols include the condensation product of about 6 moles of ethylene oxide with 1 mole of tridecanol, myristyl alcohol condensed with about 10 moles of ethylene oxide per mole of myristyl alcohol, the condensation product of ethylene oxide with coconut fatty alcohol wherein the coconut alcohol is a mixture of fatty alcohols with alkyl chains varying from 10 to 14 carbon atoms and wherein the condensate contains about 6 moles of ethylene oxide per mole of alcohol, and the condensation product of about 9 moles of ethylene oxide with the abovedescribed coconut alcohol. Examples of commercially available nonionic surfactants of this type include Tergitol®15-S-9 marketed by the Union Carbide Corporation. Neodol®5 marketed by the Shell Chemical Company and Kyro EOB® by the Proctor & Gamble Company.

2. The polyethylene oxide condensates of alkyl phenols. These compounds include the condensation products of alkyl phenols having an alkyl group containing from about 6 to about 12 carbon atoms in either a straight chain or branched chain configuration, with ethylene oxide, the said ethylene oxide being present in amounts equal to 5 to 25 moles of ethylene oxide per mole of alkyl phenol. The alkyl substituent in such compounds can be derived, for example, from polymerized propylene, diisobutylene, octene, or nonene. Examples of compounds of this type include nonyl phenol condensed with about 9.5 moles of ethylene oxide per mole of nonyl phenol, dodecyl phenol condensed with abut 12 moles of ethylene oxide per mole of phenol, dinonyl phenol condensed with about 15 moles of ethylene oxide per mole of phenol, di-isooctylphenol condensed with about 15 moles of ethylene oxide per mole of phenol. Commercially available nonionic surfactants of this type include Igepa®CO-610 marketed by the GAF Corporation; Tritol®X-45, X-114, X-100 and X-102, marketed by the Rohm and Haas Company and Surfonic®N-85, N-95 and N-120 marketed by Texaco Chemical Co.

3. The condensation products of ethylene oxide with a hydrophobic base formed by the condensation of propylene oxide with propylene glycol. The hydrophobic portion of these compounds has a molecular weight of from about 1500 to 1800 and is water insoluble. The addition of polyoxyethylene moieties of the hydrophobic portion tends to increase the water-solubility of the molecule. Examples of compounds of this type include certain of the commercially available Pluronic® surfactants marketed by Wyandotte Chemicals of BASF.

4. The condensation products of ethylene oxide with the product resulting from the reaction of propylene oxide and ethylene diamine. The hydrophobic base of these products consists of the reaction product of ethylene diamine and excess propylene oxide, said base having a molecular weight of from about 2500 to about 3000. This base is condensed with ethylene oxide to the extent that the condensation product contains from about 40% to about 80% by weight of polyoxyethylene and has a molecular weight of from about 5000 to about 11,000. Examples of this type of nonionic surfactant include certain of the commercially available Tetron® compounds marketed by BASF.

Examples of the amide type of nonionic surfactants include the ammonia, monoethanol and diethanol amides of fatty acids having an acyl moiety of from about 8 to about 18 carbon atoms. These acyl moieties are normally derived from naturally occurring glycerides, e.g., coconut oil, palm oil, soybean oil and tallow, but can be derived synthetically, e.g., by the oxidation of petroleum, or by hydrogenation of carbon monoxide by the Fischer-Tropsch process.

Examples of the semi-polar type of nonionic surfactants are the amine oxides, phosphine oxides and sulfoxides.

Ampholytic surfactants which can be used in practicing the present invention can be broadly described as derivatives of aliphatic amines which contain a long chain of about 8 to about 18 carbon atoms and an anionic water-solubilizing group, e.g., carboxy, sulfo and sulfato. Examples of compounds falling within this definition are sodium 3-dodecylamino-propionate, sodium 3-dodecylamino propane sulfonate and dodecyl dimethylammonium hexanoate.

Zwitterionic surfactants which can be used in practicing the present invention are broadly described as internally-neutralized derivatives of aliphatic quaternary ammonium and phosphonium and tertiary sulfonium compounds, in which the aliphatic radical can be straight chain or branched, and wherein one of the aliphatic substituents contains from about 8 to about 18 carbon atoms and one contains an anionic water-solubilizing group, e.g., carboxy, sulfo, sulfaro, phosphato, or phosphono.

Cationic surfactants which can be used in practicing the present invention include stearyl dimethyl benzyl ammonium chloride, coconut dimethyl benzyl ammonium chloride, cetyl pyridinium chloride and cetyl trimethyl ammonium chloride.

Hypochlorite-stable surfactants which are especially resistant to oxidation are the alkyl sulfates and paraffin sulfonates. Alkyl sulfates are the water-soluble salts of sulfated fatty alcohols containing from about 8 to about 18 carbon atoms in the alkyl group. Examples of suitable alcohols which can be employed in alkyl sulfate manufacture include decyl, lauryl, myristyl, palmityl and stearyl alcohols and the mixtures of fatty alcohols derived by reducing the glycerides of tallow and coconut oil.

Specific examples of alkyl sulfate salts which can be employed in the instant surfactant compositions include sodium lauryl alkyl sulfate, sodium stearyl alkyl sulfate, sodium palmityl alkyl sulfate, sodium decyl alkyl sulfate, sodium myristyl alkyl sulfate, potassium lauryl alkyl sulfate, potassium stearyl alkyl sulfate, potassium decyl sulfate, potassium palmityl alkyl sulfate potassium myristyl alkyl sulfate, sodium dodecyl sulfate, potassium dodecyl sulfate, potassium tallow alkyl sulfate, sodium tallow alkyl sulfate, sodium coconut alkyl sulfate, potassium coconut alkyl sulfate and mixtures of those surfactants. Highly preferred alkyl sulfates are sodium coconut alkyl sulfate, potassium coconut alkyl sulfate, potassium lauryl alkyl sulfate and sodium lauryl alkyl sulfate.

Paraffin sulfonate surfactants have the general formula $RSO_3M$, wherein R is a primary or secondary alkyl group containing from about 8 to about 22 carbon atoms (preferably 10 to 18 carbon atoms) and M is an alkali metal, e.g., sodium or potassium. Paraffin sulfonate surfactants and methods for their preparation are well known in the art. They may be prepared, for example, by reaction of hydrocarbons with sulfur dioxide, oxygen and a sulfonation reaction initiator. Alternatively, they may be prepared by reacting an alkene and a sodium bisulfite under suitable radiation or catalysis. Paraffin sulfonate surfactants are commercially available, e.g., from Farbwerke Hoechst A.G.

Preferred paraffin sulfonates herein are secondary paraffin sulfonates. Examples of specific paraffin sulfonates herein are:

Sodium-1-decane sulfonate;
Potassium-2-decane sulfonate;
Lithium-1-dodecane sulfonate;
Sodium-6-tridecane sulfonate;
Sodium-2-tetradecane sulfonate;
Sodium-1-hexadecane sulfonate;
Sodium-4-octadecane sulfonate;
Sodium-3-octadecane sulfonate.

Normally, the paraffin sulfonates are available as mixtures of individual chain lengths and position isomers, and such mixtures are suitable for use herein.

The term "soap" as used herein is meant to designate alkali metal soaps such as the sodium and potassium salts of the higher fatty acids of naturally occurring plant or animal esters, e.g., palm oil, coconut oil, babassu oil, soybean oil, castor oil, tallow, synthetic whale and fish oils, grease and lard and mixtures thereof. Sodium and potassium soaps can be made by direct saponification of the fats and oils or by the neutralization of the fatty acids which are prepared in a separate manufacturing process. Examples of suitable soaps are the sodium, potassium, ammonium and alkylolammonium salts of higher fatty acids ($C_{10}$–$C_{20}$) Particularly useful are the sodium and potassium salts of the mixtures of fatty acids derived from coconut oil and tallow, i.e., sodium or potassium tallow and coconut soap.

Preferably, low foaming surfactants such as those prepared from mixed alkylene oxide adducts of alkyl phenols, fatty alcohols, water and fatty amine oxides are utilized as the surfactant in the compositions of this invention.

A wide variety of chain extenders are useful in the process of this invention although the preferred chain extenders are difunctional. Mixtures of difunctional and trifunctional chain extenders are also useful. Chain extenders suitable for use in the process of this invention include diols, amino alcohols, diamines or mixtures thereof. Low molecular weight linear diols such as 1,4-butandiol, propylene glycol and ethylene glycol have been found suitable for use in this invention. An especially preferred chain extender is propylene glycol.

If needed, the following catalysts are useful. Catalysts such as tertiary amines or an organic tin compound or other polyurethane catalysts may be used. The organic tin compound may suitably be a stannous or stannic compound such as a stannous salt of a carboxylic acid, a trialkyltin oxide, a dialkyltin dihalide, a dialkyltin oxide, etc. wherein the organic groups of the organic portion of the tin compound are hydrocarbon groups containing from 1 to 8 carbon atoms. For example, dibutyltin dilaurate, dibutyltin diacetate, diethyltin diacetate, dihexltin, diacetate, di-2-ethylhexyltin oxide, dioctyltin dioxide, stannous oxtoate, stannous oleate, etc., or a mixture thereof, may be used.

Tertiary amine catalysts include trialkylamines (e.g., trimethylamine, triethylamine), heterocyclic amines such as N-alkylmorpholines (e.g., N-methylmorpholine, N-ethylmorpholine, dimethyldiaminodiethyl ether, etc.), 1,4-dimethylpiperazine, triethylenediamine, etc. and aliphatic polyamines such as N,N,N',N'-tetramethyl-1,3-butane diamine.

The compositions of this invention may also include, in addition to conventional detergents, brighteners, hydrotopes, germicides, soil suspending agents, antiredisposition agents, antioxidants, bleaches, coloring materials, perfumes, water-soluble alcohols, foam boosters, abrasives, etc.

Methods for the manufacture of surfactant bars from solid surfactant compositions, such as those of this invention, are well known in the art, and described in U.S. Pat. Nos. 4,201,743; 4,453,909; 4,438,010; 4,515,707 and 4,521,541.

The following examples illustrate the nature of the instant invention and are not intended to be limitative.

EXAMPLE 1

Surfactant Composition of Polyurea from JEFFAMINE ®ED-200-1, Amine and Isophorone Diisocyanate and Containing SURFONIC ®N-95 Surfactant To a 250-ml 3-necked flask equipped with a stirrer, thermometer, and addition funnel was added 50g of SURFONIC ®N-9.5 molar ethoxylate of nonylphenol) and 50g of ED-2001. The mixture was heated slowly. Then at about 60° C., 5.5 g of isophorone diisocyanate was added. After about 40 minutes, the contents were heated to 110° C. and held at this temperature for one hour. The product was a white solid which was water soluble.

EXAMPLE 2

Surfactant Composition of Polyurea from JEFFAMINE ®ED-600 Amine and Isophorone Diisocyanate and Containing SURFONIC ®N-95 Surfactant To a 250-ml 3-necked flask equipped with a stirrer, thermometer, and addition funnel was added JEFFAMINE ® ED-600 Amine (48g, 0.08M, a liquid product in comparison with solid JEFFAMINE ®ED-2001), SURFONIC ®N-95 (50g) and isophorone diisocyanate (17.8g, 0.08 moles). After 30 minutes at 60°-100° C. the contents were heated to 150° C. and held for one hour. The product appeared to be somewhat insoluble but it formed a nice, soapy solution.

EXAMPLE 3

Surfactant Composition of Polyurea from JEFFAMINE ®ED- 2001 Amine, and Tetramethyl Xylene Diisocyanate and Containing SYRFIBUC ®N-95 Surfactant The experimental procedure of Example 1 was repeated except that tetramethyl xylene diisocyanate (6.1 g, 0.025M) was used instead of isophorone diisocyanate. The reaction temperature was 120° C. The product was a white solid soluble in water. It formed a nice, soapy solution.

EXAMPLE 4

Surfactant Composition of Polyurea from JEFFAMINE ®ED-2001 Amine and Toluene Diisocyanate and Containing SURFONIC ®N-95 Surfactant The experimental procedure of Example 1 was repeated except using toluene diisocyanate (4.4g, 0.025 moles) instead of isophorone diisocyanate. The reaction temperature was 120° C. The resulting product was a white solid soluble in water. It formed a very nice foaming solution when added to water.

EXAMPLE 5

Surfactant Composition of Polyurethane from Polyethylene Oxide 1500 and Isophorone Diisocyanate and Containing SURFONIC ®N-95 Surfactant This experiment involved polyethylene oxide 1500 ($HO(CH_2O)_{34}H$) (50g, 0.033M), isophorone diisocyanate (7.4g, 0.33M) and SURFONIC ®N-95 (50g). The reaction temperature was 120° C. and the reaction time was 3 hours. The product was a soft solid but completely water soluble which formed a nice foaming aqueous solution.

EXAMPLE 6

Surfactant Composition of Polyurea from JEFFAMINE ®ED-2001 Amine and Isophorone Diisocyanate and Containing IVORY ®Soap The experimental procedures of Example 5 were repeated except IVORY ® soap was used instead of SURFONIC ® N-95 detergent. The reaction was carried out at 127°-130° C. The product was a hard, white solid which was water soluble. It formed a good detergent solution. This product was suitable for preparing molded or shaped articles such as bathtub toys.

EXAMPLE 7

Surfactant Composition of Polyurethane from Polyethylene Oxide 1500 and Isophorone Diisocyanate and Using a Tin Catalyst and Containing SURFONIC ®N-95 Surfactant Example 5 was repeated except that 4 drops of dibutyl tin dilaurate was used as a catalyst. The product was a white, waxy solid which was soluble in water.

EXAMPLE 8

Surfactant Composition of Polyurethane from Polyethylene Oxide 1500 and Toluene Diisocyanate with Propylene Glycol Chain Extender and Containing NEODOL ®45-7 Surfactant To a 250-ml 3-necked flask, equipped with a thermometer, and addition funnel and a nitrogen inlet was added 50g of NEODOL ®45-7 (a liquid nonionic surfactant made by ethoxylation of fatty alcohols and sold by Shell Chemical Company), 50g of polyethylene oxide 1500, 2.5g of propylene glycol and four drops of dibutyl tin dilaurate. The contents were heated to 55° C. and the addition of 1.6g of toluene diisocyanate (TDI) started. After all of the TDI was added, the reaction mixture was heated to 20° C. and held at this temperature for three hours. The product slowly dissolved in water to form a nice soapy solution.

EXAMPLE 9

Surfactant Composition of Polyurethane From; Polyethylene Oxide - 1500 and Toluene Diisocyanate and Containing NEODOL ®45-7 Surfactant Example 8 above was repeated and the propylene glycol was eliminated. The product was a white solid, completely soluble in water which was used to clean laboratory glassware.

EXAMPLE 10

Surfactant Composition of Polyurea from JEFFAMINE®ED-2001 Amine and Toluene Diisocyanate and Containing Soap IVORY®Soap Using the procedure of Example 6, an attractive white soap bar was obtained when 4.4g (0.025 moles) of toluene diisocyanate was allowed to react with 50g of JEFFAMINE®ED-2001 amine in the presence of 50 g of solid IVORY® soap. The water solution foamed.

EXAMPLE 11

Surfactant Composition of Polyurea from JEFFAMINE® ED-4000 Amine and Toluene Diisocyanate and Containing IVORY® Soap Using the same procedure as an Example 10 above, a solid product was obtained which was water soluble, yielding a heavy foam when 50 g of JEFFAMINE® ED-4000 amine was allowed to react with 2.2g of toluene diisocyanate in the presence of 50g of IVORY® soap.

What is claimed is:

1. A surfactant composition consisting essentially of a water-soluble polyurethane or polyurea or mixtures thereof dispersed in a surfactant produced by reacting together a polyisocyanate, a polyol or a polyamine and a surfactant and wherein the said water-soluble polyurethane or polyurea consists essentially of about 2 to about 98 weight percent of the said composition with the said surfactant as a major portion of the balance.

2. A surfactant composition consisting essentially of a water-soluble polyurethane dispersed in a surfactant produced by reacting together a polyisocyanate, a polyol and a surfactant and wherein the said polyurethane consists essentially of about 2 to about 98 weight percent of the said composition with the said surfactant as a major portion of the balance.

3. The surfactant composition of claim 2 wherein the said polyisocyanate is an aromatic diisocyanate.

4. The surfactant composition of claim 3 wherein the said aromatic diisocyanate is toluene diisocyanate.

5. The surfactant composition of claim 3 wherein the said aromatic diisocyanate is tetramethylene xylene diisocyanate.

6. The surfactant composition of claim 2 wherein the said polyisocyanate is an aliphatic diisocyanate.

7. The surfactant composition of claim 6 wherein the said aliphatic diisocyanate is isophorone diisocyanate.

8. The surfactant composition of claim 6 wherein the said polyol is a polyethylene glycol having a molecular weight greater than 600.

9. The surfactant composition of claim 2 wherein the said surfactant is a nonylphenol ethoxylate.

10. The surfactant composition of claim 2 wherein the said surfactant is a soap.

11. The surfactant composition of claim 2 wherein the said polyisocyanate is toluene diisocyanate, the said polyol is a polyethylene glycol having a molecular weight greater than 600 and the said surfactant is a soap.

12. The surfactant composition of claim 2 wherein the said polyisocyanate is isophorone diisocyanate, the said polyol is a polyethylene glycol having a molecular weight greater than 600 and the said surfactant is a nonylphenol ethoxylate.

13. The surfactant composition of claim 2 wherein the said polyurethane consists essentially of about 50 to about 98 weight percent of the said composition with the surfactant as a major portion of the balance.

14. The surfactant composition of claim 2 wherein the said polyol is a polyoxyalkylene glycol having a molecular weight greater than 600.

15. A surfactant composition comprising a water-soluble polyurea dispersed in a surfactant and wherein the said polyurea comprises about 2 to about 98 weight percent of the composition with the said surfactant as a major portion of the balance.

16. The surfactant composition of claim 15 wherein the said surfactant composition is produced by reacting together a polyisocyanate, a polyamine and a surfactant to form the said water-soluble polyurea dispersed in the said surfactant.

17. The surfactant composition of claim 16 wherein the said polyisocyanate is an aromatic diisocyanate.

18. The surfactant composition of claim 17 wherein the said aromatic diisocyanate is toluene diisocyanate.

19. The surfactant composition of claim 17 wherein the said aromatic diisocyanate is tetramethyl xylene diisocyanate.

20. The surfactant composition of claim 16 wherein the said polyisocyanate is an aliphatic diisocyanate.

21. The surfactant composition of claim 20 wherein the said aliphatic diisocyanate is isophorone diisocyanate.

22. The surfactant composition of claim 15 wherein the said polyurea comprises about 50 to about 98 weight percent of the said composition with the surfactant as a major portion of the balance.

23. The surfactant composition of claim 16 wherein the said surfactant is a nonylphenol ethoxylate.

24. The surfactant composition of claim 15 wherein the said polyisocyanate is toluene diisocyanate, the said polyamine is a polyoxyalkylene diamine having a molecular weight of about 200 to about 4000 and the said surfactant is a soap.

25. A surfactant composition comprising a water-soluble polyurea dispersed in a surfactant wherein the said water-soluble polyurea comprises about 2 to about 98 weight percent of the said composition with the said surfactant as a major portion of the balance and wherein the said surfactant composition is produced by reacting together a polyoxyalkylene diamine having a molecular weight of about 200 to about 4000, a polyisocyanate and a surfactant to form the said water-soluble polyurea dispersed in the said surfactant.

26. A surfactant composition comprising a water-soluble polyurea dispersed in a surfactant, wherein the said water-soluble polyurea comprises about 2 to about 98 weight percent of the said composition with the said surfactant as a major portion of the balance and wherein the said surfactant composition is produced by reacting together a polyoxyalkylene diamine of the formula:

wherein R is a radical of the formula:

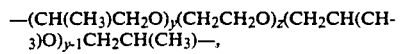

wherein y ranges from 1 to 5 and z ranges from 1 to 90, a polyisocyanate and a surfactant to form the water-soluble polyurea dispersed in the said surfactant.

27. A surfactant composition comprising a water-soluble polyurea dispersed in a surfactant, wherein the said water-soluble polyurea comprises about 2 to about 98 weight percent of the said composition with the said surfactant as a major portion of the balance, wherein the said composition is produced by reacting together a polyisocyanate, a polyamine and a surfactant to form the said water-soluble polyurea dispersed in the said surfactant and wherein the said polyisocyanate is toluene idisocyanate, the said polyamine is a polyoxyalkylene diamine having a molecular weight of about 200 to about 4000 and the said surfactant is a nonylphenol ethoxylate.

28. A surfactant composition comprising a water-soluble polyurea dispersed in a surfactant, wherein the said water-soluble polyurea comprises about 2 to about 98 weight percent of the said composition with the said surfactant as the major portion of the balance, wherein the said composition is produced by reacting together a polyisocyanate, a polyamine and a surfactant and wherein the polyisocyanate is isophorone diisocyanate, the said polyamine is a polyoxyalkylene diamine having a molecular weight of about 200 to about 4000 and the said surfactant is a nonylphenol ethoxylate.

29. A surfactant composition comprising a water-soluble polyurethane or polyurea or mixtures thereof dispersed in a surfactant, wherein the said water-soluble polyurethane or polyurea comprises about 2 to about 98 weight percent of the said composition with the said surfactant as a major portion of the balance and wherein the surfactant composition additionally comprises a water-insoluble polyurethane or polyurea.

30. A solid surfactant composition consisting essentially of a water-soluble polyurethane dispersed in a surfactant, wherein the said water-soluble polyurethane consists essentially of about 2 to about 98 weight percent of the said composition with the said surfactant as the major portion of the balance and wherein the said surfactant composition is produced by reacting together an aromatic or aliphatic diisocyanate, a polyoxyalkylene glycol having a molecular weight greater than 600 and a surfactant.

31. The surfactant composition of claim 30 wherein the said polyurethane consists essentially of about 50 to about 98 weight percent of the said composition with the surfactant as a major portion of the balance.

32. The surfactant composition of claim 30 wherein the said diisocyanate is an aromatic diisocyanate.

33. The surfactant composition of claim 32 wherein the said aromatic diisocyanate is toluene diisocyanate.

34. The surfactant composition of claim 32 wherein the said aromatic diisocyanate is tetramethyl xylene diisocyanate.

35. The surfactant composition of claim 30 wherein the said diisocyanate is an aliphatic diisocyanate.

36. The surfactant composition of claim 30 wherein the said surfactant is a nonylphenol ethoxylate.

37. The surfactant composition of claim 30 wherein the said surfactant is a soap.

38. A solid surfactant composition comprising a water-soluble polyurea dispersed in a surfactant wherein the said water-soluble polyurea comprises about 2 to about 98 weight percent of the said composition with the said surfactant as the major portion of the balance and wherein the said surfactant composition is produced by reacting together a polyisocyanate, a polyoxyalkylene diamine having a molecular weight of about 200 to about 4000 and a surfactant.

39. The surfactant composition of claim 38 wherein the said polyisocyanate is an aromatic diisocyanate.

40. The surfactant composition of claim 39 wherein the said aromatic diisocyanate is toluene diisocyanate.

41. The surfactant composition of claim 39 wherein the said aromatic diisocyanate is tetramethylene xylene diisocyanate.

42. The surfactant composition of claim 38 wherein the said polyisocyanate is an aliphatic diisocyanate.

43. The surfactant composition of claim 42 wherein the said aliphatic diisocyanate is isophorone diisocyanate.

44. The surfactant composition of claim 38 wherein the said surfactant is a nonylphenol ethoxylate.

45. The surfactant composition of claim 38 wherein the said surfactant is a soap.

46. A process for preparing the surfactant composition of claim 2 wherein the said composition is prepared by reacting together a polyisocyanate, a polyol and a surfactant to form a water-soluble polyurethane dispersed in the said surfactant.

47. The process of claim 28 wherein the said polyisocyanate is an aromatic diisocyanate.

48. The process of claim 28 wherein the said polyisocyanate is an aliphatic diisocyanate.

49. The process of claim 28 wherein the said polyol is a polyethylene glycol having a molecular weight greater than 600.

50. The process of claim 28 wherein the said composition is a solid composition molded or shaped into a surfactant bar.

51. A process for preparing the surfactant composition of claim 15 which comprises reacting a polyisocyanate, a polyamine and a surfactant to form the said water-soluble polyurea dispersed in the said surfactant.

52. The process of claim 51 wherein the said polyisocyanate is an aromatic diisocyanate.

53. The process of claim 51 wherein the said polyisocyanate is an aliphatic diisocyanate.

54. The process of claim 51 wherein the said composition is a solid composition molded or shaped into a surfactant bar.

55. A process for preparing a surfactant composition comprising a water-soluble polyurea dispersed in a surfactant, wherein the said polyurea comprises about 2 to about 98 weight percent of the composition with the said surfactant as a major portion of the balance and wherein the said water-soluble polyurea is formed by reacting together a polyisocyanate, a surfactant and a polyoxyalkylene diamine having a molecular weight of about 200 to about 4000.

* * * * *